(12) United States Patent
Galsim et al.

(10) Patent No.: US 12,068,635 B2
(45) Date of Patent: Aug. 20, 2024

(54) MODULAR POWER SYSTEM

(71) Applicant: SCHNEIDER ELECTRIC IT CORPORATION, Foxboro, MA (US)

(72) Inventors: Marlon Galsim, Shanghai (CN); Damir Klikic, Waltham, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 144 days.

(21) Appl. No.: 17/743,556

(22) Filed: May 13, 2022

(65) Prior Publication Data
US 2023/0369887 A1    Nov. 16, 2023

(51) Int. Cl.
*H02J 9/06* (2006.01)
*H01M 10/42* (2006.01)
*H01M 10/48* (2006.01)
*H01M 50/213* (2021.01)
*H01M 50/296* (2021.01)
*H02J 7/00* (2006.01)

(52) U.S. Cl.
CPC ........... *H02J 9/061* (2013.01); *H01M 10/425* (2013.01); *H01M 10/488* (2013.01); *H01M 50/213* (2021.01); *H01M 50/296* (2021.01); *H02J 7/0013* (2013.01); *H02J 7/0047* (2013.01); *H01M 2010/4271* (2013.01); *H02J 2207/20* (2020.01)

(58) Field of Classification Search
CPC ........ H02J 9/061; H02J 7/0013; H02J 7/0047; H02J 2207/20; H01M 10/425; H01M 10/488; H01M 50/213; H01M 50/296; H01M 2010/4271
USPC ........................................................ 307/64
See application file for complete search history.

(56) References Cited

U.S. PATENT DOCUMENTS

2006/0056142 A1* 3/2006 Takahashi ................. G06F 1/30
                                                          361/679.48
2007/0217128 A1* 9/2007 Johnson Jr. .......... H05K 7/1492
                                                          361/622

FOREIGN PATENT DOCUMENTS

CN    102624053 B    10/2014
WO    2018045823 A1    3/2018

* cited by examiner

*Primary Examiner* — Rexford N Barnie
*Assistant Examiner* — Swarna N Chowdhuri
(74) *Attorney, Agent, or Firm* — Lando & Anastasi, LLP

(57) ABSTRACT

A power system includes a base module including a system management controller (SMC) and a power distribution unit (PDU), an uninterruptible power supply (UPS) module including a UPS, and a battery module including a battery. The base module includes a first edge, and the battery module is detachable from UPS module in a direction perpendicular to the first edge.

31 Claims, 10 Drawing Sheets

MODULAR POWER SYSTEM

BACKGROUND OF DISCLOSURE

1. Field of Disclosure

Aspects of the present disclosure relate generally to power systems used in equipment racks configured to support electronic equipment, such as data processing, power, networking and telecommunications equipment.

2. Discussion of Related Art

Equipment enclosures or racks for housing electronic equipment, such as data processing, power, networking and telecommunications equipment have been used for many years. Such racks are used to contain and to arrange the equipment in equipment rooms and large data centers, as well as small wiring closets, micro-data centers and small rooms. An equipment rack can be an open configuration and can be housed within a rack enclosure, although the enclosure may be included when referring to a rack.

Traditional power system solutions for equipment racks employ multiple independent and separate systems including uninterruptible power supplies (UPSs), external batteries, human machine interface (HMI) controllers, sensors, power distribution units (PDUs) and a cloud gateway. The provision of separate components unnecessarily takes up valuable space within the equipment rack, causes high servicing costs, and negatively effects equipment reliability.

SUMMARY OF DISCLOSURE

One aspect of the present disclosure is directed to a power system comprising a base module including a system management controller (SMC) and a power distribution unit (PDU), an uninterruptible power supply (UPS) module including a UPS, and a battery module including a battery. The base module includes a first edge, and the battery module is detachable from UPS module in a direction perpendicular to the first edge.

Embodiments of the power system further may include configuring the base module to have a casing configured to support the SMC and the PDU. The casing may include an L-shaped feature having the first edge and a second edge, with the first edge being perpendicular and adjacent to and shorter than the second edge. The UPS module may be shaped to fit within the L-shaped feature of the casing. A leg of the L-shaped feature of the casing may include a plurality of outlets. The plurality of outlets may include at least one of a surge outlet and a UPS outlet. A leg of the L-shaped feature of the casing may include a plurality of ports. The plurality of ports may include at least one of a sensor port, a USB port and an ethernet port. The UPS module may include a first interface provided on a surface of the UPS module, and the base module may include a first mating interface provided on a surface of the first edge of the base module, with the first interface being configured to connect to the first mating interface to connect the UPS module to the base module. The first interface may be a male hot-swappable interconnect feature and the first mating interface may be a female hot-swappable interconnect feature. The battery module may include a second interface provided on a surface of the battery module, and the UPS module may include a second mating interface provided on another surface of the UPS module, with the second interface being configured to connect to the second mating interface to connect the battery module to the UPS module. The second interface may be a male hot-swappable interconnect feature and the second mating interface may be a female hot-swappable interconnect feature. The surfaces of the UPS module may be parallel with one another. The UPS of the UPS module may include an AC-DC converter. The battery module may include an LED to illustrate a state of the battery. The power system further may include an extended runtime battery module. The power further may include a maintenance bypass switch configured to bypass the UPS of the UPS module while maintaining power to equipment coupled to the PDU during UPS service or UPS module replacement. The base module may include a user interface. The UPS module may be detachable from the base module in a direction perpendicular to the first edge.

Another aspect of the present disclosure is directed to a method of assembling a power system. In one embodiment, the method comprises: providing an integrated system management controller (SMC) and power distribution unit (PDU) base module including a SMC and a PDU, the base module including a first edge; installing an uninterruptible power supply (UPS) module on the base module, the UPS module including a UPS; and connecting a battery module to the UPS module in a direction perpendicular to the first edge, the battery module including a battery.

Embodiments of the method further may include installing the UPS module in a direction perpendicular to the first edge. The method further may include removing the UPS module from the base module in a direction perpendicular to the first edge. The method further may include removing the battery module from the UPS module in a direction perpendicular to the first edge. The base module may include a casing configured to support the SMC and the PDU. The casing may include an L-shaped feature having the first edge and a second edge, with the first edge being perpendicular and adjacent to and shorter than the second edge. The UPS module may be shaped to fit within the L-shaped feature of the casing. The UPS module may include a first interface provided on a surface of the UPS module, and the base module may include a first mating interface provided on a surface of the first edge of the base module. Installing the UPS module on the base module may include connecting the first interface to the first mating interface. The first interface may be a male hot-swappable interconnect feature and the first mating interface may be a female hot-swappable interconnect feature. The battery module may include a second interface provided on a surface of the battery module, and the UPS module may include a second mating interface provided on another surface of the UPS module. Connecting the battery module to the UPS module may include connecting the second interface to the second mating interface. The second interface may be a male hot-swappable interconnect feature and the second mating interface may be a female hot-swappable interconnect feature. The method further may include connecting an extended runtime battery module to one of the UPS module and the battery module. The method further may include bypassing the UPS of the UPS module while maintaining power to equipment coupled to the PDU during UPS service or UPS module replacement.

Yet another aspect of the present disclosure is directed to a method of providing uninterruptible power in an equipment rack having a plurality of electronic equipment. In one embodiment, the method comprises: securing a modular power system within an interior of the equipment rack, the modular power system including a base module having a system management controller (SMC) and a power distribution unit (PDU), an uninterruptible power supply (UPS)

module including a UPS, and a battery module including a battery, wherein the base module includes a first edge, and wherein the battery module is detachable from UPS module in a direction perpendicular to the first edge; coupling the modular power system to a power input; and coupling each of the plurality of electronic equipment provided in the equipment rack to the modular power system to provide power to each of the plurality of electronic equipment, the modular power system being configured to provide uninterruptible power to each of the plurality of electronic equipment in the event of failure of the power input.

BRIEF DESCRIPTION OF DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the disclosure. In the figures, identical or nearly identical components illustrated in various figures may be represented by like numerals. For purposes of clarity, not every component may be labeled in every figure. In the drawings.

DETAILED DESCRIPTION

Figure 1:
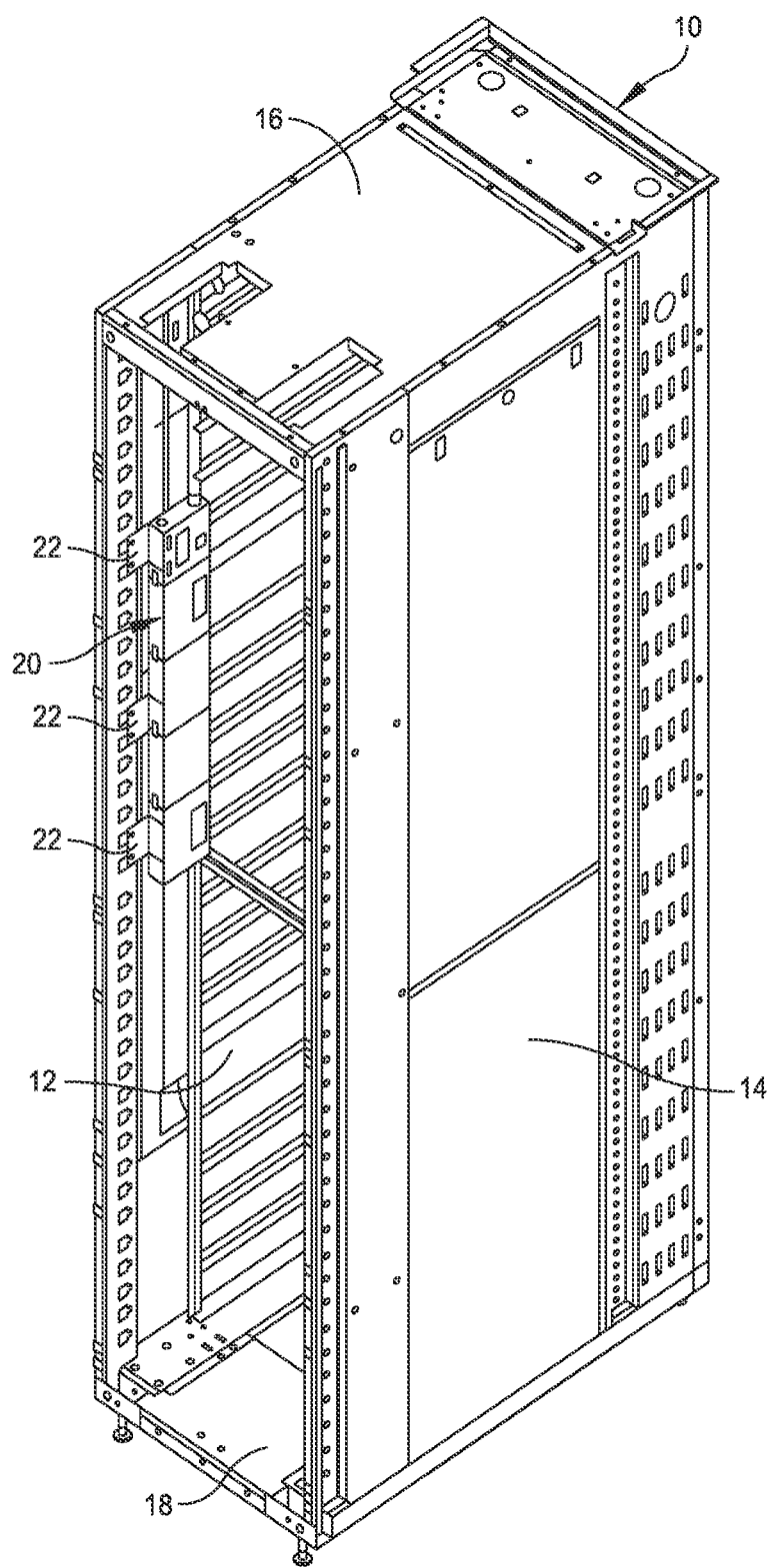
FIG. 1 is a perspective view of a modular power system of an embodiment of the present disclosure mounted within an equipment rack.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing", "involving", and variations thereof herein, is meant to encompass the items listed thereafter and equivalents thereof as well as additional items.

All-in-one equipment racks may be used in micro-data centers for edge computing application, which are typically deployed in relatively small locations without adequate cooling resources. These applications use racks sealed from the surrounding ambient air for physical security and environment protection. The equipment racks require highly varied requirements, including but not limited to environment, serviceability, security, and management.

As used herein, "enclosures" and "racks" are used to describe apparatus designed to support electronic equipment.

Edge computing is a rapidly emerging IT infrastructure solution. In one embodiment, edge computing is a distributed system in which the computing system is installed close to the data source, such as internet of things (IoT). Edge computing hardware is fully integrated system and requires less space. Edge computing server and other hardware can be configured to utilize emerging power system, such as 12 volts (V) direct current (DC) and 48 V DC or a mixture of alternating current (AC) and DC power to improve operating efficiency and reliability.

In some embodiments, the modular power system of the present disclosure employs a modular power architecture for 120 V AC/220 V AC UPS, 12 V DC, 48 V DC and flexible battery backup time by utilizing plug and play battery module. The modular power system has a low profile and integrated power distribution unit (PDU) to save space in an equipment rack. Large data centers traditionally use AC powered and emerging DC powered IT equipment.

In some embodiments, the modular power system can be configured to provide both AC and DC power to meet existing and future customer power requirements. IoT and 5G applications typically require a 12 V, 48 V DC power system. The modular power system is configured to provide full DC power for both 12 V DC and 48 V DC systems.

In some embodiments, the modular power system is configured to provide flexible redundancy for UPS and battery modules. As mentioned, many environments do not have sufficient cooling and require a higher efficiency power source. The modular power system uses high density and efficient power modules. Similarly, equipment racks can be packed full of electronic equipment, and thus have limited space for a traditional bulky AC UPS system and PDU. The modular power module can be configured to integrate AC UPS and PDU and to be mounted to the side or back of the equipment rack.

In some embodiments, the modular power system provides redundancy that can be tailored to a particular power requirement and ease of installation of additional modules for future power needs. The modular power system can be configured to achieve a flexible battery runtime by utilizing a daisy chain battery backup module in which additional battery module(s) can be installed as needed. As mentioned, the modular power system includes a low profile for flexible integration to any edge computing system, such as self-service POS, Telco Network, IoT Hub, Road Traffic Management.

In some embodiments, the modular power system includes a battery module having a high-density lithium-ion battery, with additional battery being connected as needed.

In some embodiments, the modular power system includes a power module that is configured to interface with a power rail and CAN bus control network. The power module can be selected, e.g., 120 V AC, 220 V AC, 12 V DC, 48 V DC, based on a need for a certain power rating. Additional redundant power modules can be added in the power rail network as needed.

As mentioned, edge computing power quality may not be as reliable as the facility power source, and may require additional battery runtime for reliable operation. In some embodiments, the modular power system employs a hot-swappable battery module to provide flexibility for configuring battery runtime as needed. The battery modules are configured to interface with compatible power modules and can be connected to the power rail without hardware modification.

In some embodiments, the modular power system can be configured to effectively meet multiple market segments. The modular components reduce design complexities and ease of design upgrade. End users can select a basic configuration and additional power modules can be added for future requirements.

In some embodiments, the modular power system includes a maintenance bypass switch to enable easy servicing and replacement of the modules without affecting the normal operation of the IT loads.

In some embodiments, the modular power system is configured to occupy a single U (1-U) rack space. Typical U-height requirements for traditional systems can include a UPS System with external battery—4 U, a local monitoring controller—1 U, and an environment and sensor manager—1 U. The modular power system increases available U space within the equipment rack to provide more space for computing and networking equipment.

In some embodiments, the modular power system provides an integrated solution thereby avoiding the need for multiple independent systems with separate communication interfaces, cabling and communication protocols, which complicates the networking and data processing. For example, a complicated networking interfaces requires a separate hardware gateway to accumulate the data before transferring it to the local HMI or cloud. The modular power system includes a system management controller (SMC) and a PDU in a base module, with the SMC being configured to manage environmental sensors. The modular power system further includes an internal UPS, PDU and battery module communication interface. Thus, the modular power system requires no interface cables. The modular power system is configured with a single point gateway to LAN and Cloud interface.

In some embodiments, a SMC module is configured to control and measure power on each individual outlet of a PDU.

In some embodiments, the SMC module is configured with a single IP address for communicating data to a remote controller.

Referring to the drawings, and more particularly to FIG. 1, a typical equipment rack is generally indicated at 10. The equipment rack 10 is configured to support and house electrical equipment, such as data processing and networking equipment (e.g., servers, server blades, associated power distribution equipment, etc.) and telecommunication equipment. In the shown embodiment, the equipment rack 10 embodies a rectangular, box-like structure that is configured such that it can be assembled with or connected to other, similarly shaped structures. The equipment rack 10 includes a pair of side walls 12, 14, a top wall (or roof) 16, and a bottom wall 18, which together define the sides, top and bottom of the equipment rack, respectively. As shown, the equipment rack 10 includes an open back, but in some embodiments the equipment rack may include a back wall or back door to cover the back of the equipment rack. Although not shown, the front of the equipment rack may be open, or include a front door or a front panel to cover the front of the equipment rack. In at least one embodiment, the equipment rack 10 may be configured to accommodate standard nineteen-inch or twenty-three-inch rack mountable equipment.

As shown, the equipment rack 10 includes slides or rails within the interior of the equipment rack to mount electronic equipment. Heavy electronic equipment, which is commonly accessed for servicing or even replacement, is often not mounted directly onto the equipment rack but instead is supported by slides or rails. A pair of rails is mounted directly onto the rack, and the electronic equipment then slides into the rack along the rails. When in place, the electronic equipment may also then be bolted to the rack. The rails may also be able to fully support the electronic equipment in a position where it has been slid clear of the equipment rack. Some rack slides can include a tilt mechanism allowing easy access to the top or bottom of rack-mounted electronic equipment when it is fully extended from the equipment rack. The sliding rails can lock in various extended positions to prevent the electronic equipment from moving when extended out from the rack for service.

The equipment rack 10 can be fabricated from any suitable lightweight, rigid materials, such as, but not limited to, steel or aluminum. It should be noted that the chosen material, in addition to being lightweight and rigid in construction, should be reasonable in cost and easy to fabricate. In at least one embodiment, it is desirable to use materials having a conductive finish to allow grounding of the electronic components housed within the equipment rack and to allow all conductive portions of the equipment rack to be grounded.

To power electronic equipment, in one embodiment, a power strip or busbar may be provided at a back of the equipment rack 10. The busbar typically extends from the top of the equipment rack to the bottom of the equipment rack along a side wall. In another embodiment, dedicated power cables can be provided. As shown, a modular power system, generally indicated at 20, is mounted at the back of the equipment rack 10 by brackets, each indicated at 22. The provision of the modular power system 20 provides power backup and management of electronic equipment supported by the equipment rack 10.

Figure 2:
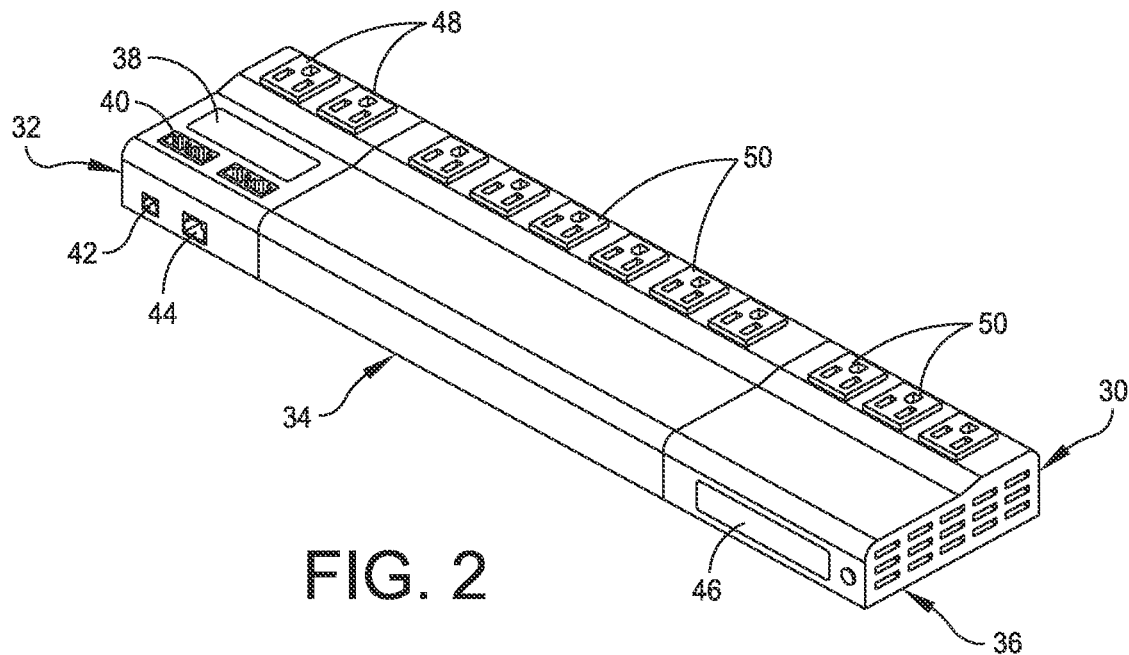
FIG. 2 is a perspective view of a modular power system of an embodiment of the present disclosure.

Referring to FIG. 2, an embodiment of a modular power system is generally indicated at 30. As shown, the modular power system 30 includes a base module, generally indicated at 32, a UPS module, generally indicated at 34, and a battery module, generally indicated at 36. The modular power system 30 is configured to provide 2.5 kW online UPS backup power. The module power system 30 further is configured to have an integrated AC PDU (outlets), a monitor 38, a rack sensor port 40, and networking functionalities, including a USB port 42 and an Ethernet port 44. In one embodiment, the battery module 36 includes a 2.5 kW lithium-ion battery, capable of a three minute to fifteen-minute runtime in the event of a power failure. The battery module 36 further includes an integrated LED 46 to provide a visual indication of a status of the battery.

As shown, the PDU of the base module 32 includes a number of outlets. In one embodiment, the base module 32 includes two surge outlets, each indicated at 48, and nine UPS outlets, each indicated at 50. Exemplary uses or applications for the modular power system 30 include but are not limited to electronic toll collection systems, traffic management systems, intelligent micro-data centers (IMDCs), self-service point of sale (POS) systems, and IoT hubs.

Figure 3:
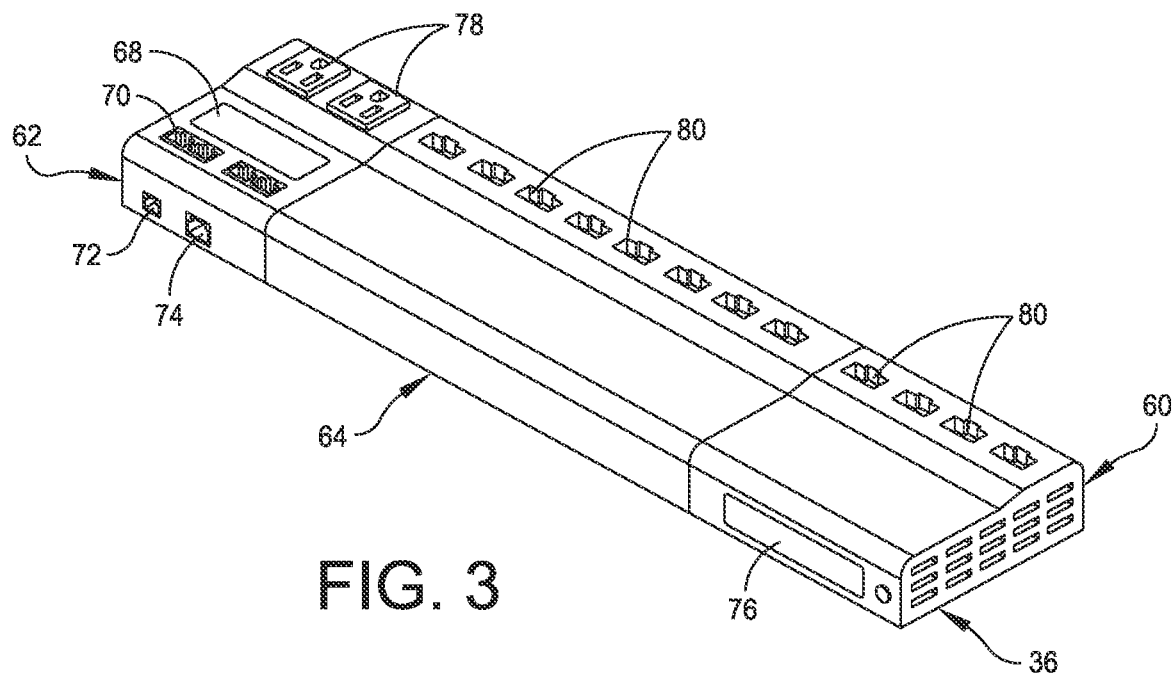
FIG. 3 is a perspective view of a modular power system of an embodiment of the present disclosure.

Referring to FIG. 3, an embodiment of a modular power system is generally indicated at 60. As with modular power system 30, the modular power system 60 includes a base module, generally indicated at 62, a UPS module, generally indicated at 64, and a battery module, generally indicated at 66. Generally speaking, the modular power system 60 is nearly identical to the modular power system 30, except that the modular power system 60 is configured to provide 2.5 kW 48 V DC backup power. As with modular power system 30, the module power system 60 further is configured to have an integrated DC PDU (outlets), a monitor 68, a rack sensor port 70, and networking functionalities, including a USB port 72 and an Ethernet port 74. In one embodiment, the battery module 66 includes a 2.5 kW lithium-ion battery, capable of a three minute to fifteen-minute runtime. The battery module 66 further includes an integrated LED 76 to provide a visual indication of a status of the battery.

As shown, the PDU of the base module 62 includes a number of outlets. In one embodiment, the base module 62 includes two surge outlets, each indicated at 78, and twelve DC outlets, each indicated at 80. Exemplary uses or applications for the modular power system 60 include but are not limited to electronic toll collection systems, traffic management systems, intelligent micro-data centers (IMDCs), self-service point of sale (POS) systems, and IoT hubs.

Figure 4B:
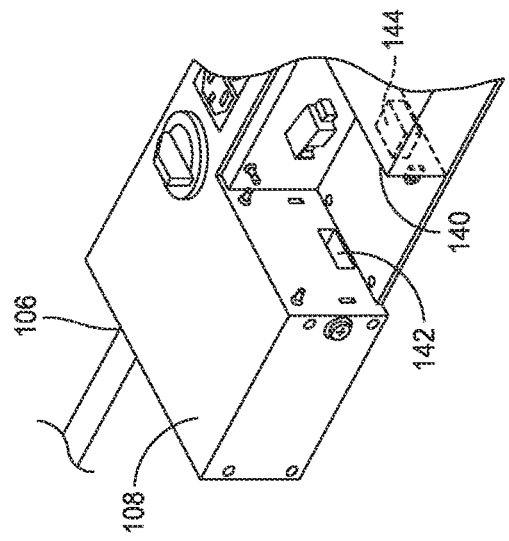
FIG. 4B is an enlarged perspective view of a portion of a base module of the modular power system.
Figure 4A:
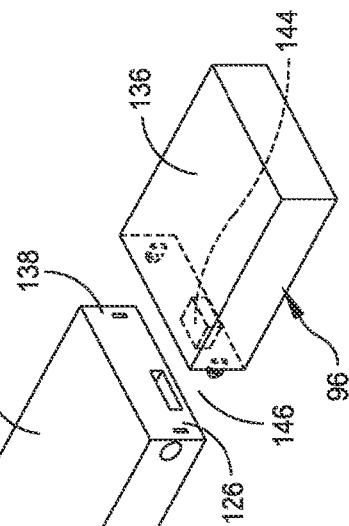
FIG. 4A is an exploded perspective view of a modular power system of an embodiment of the present disclosure.

Referring to FIG. 4A, a modular power system is generally indicated at 90. As with modular power systems 30, 60, the modular power system 90 includes a base module, generally indicated at 92, a UPS module, generally indicated at 94, and a battery module, generally indicated at 96. The base module 92 includes a base module casing 98 that is configured to house the components of the base module, which includes an SMC 100 and a PDU 102, which embody several outlets. In one embodiment, the SMC 100 is configured to interact with different types of sensors, including temperature, humidity, vibration, and airflow sensors. As shown, the base module 92 includes an AC power input 104, which connects to facility AC power, e.g., by power cord 106.

The base module casing 98 of the base module 92 is configured with an L-shaped feature having a first leg 108 with a first edge 110 and a second leg 112 with a second edge 114. The second leg 112 further includes a third edge 116, which is parallel to the first edge 110 of the first leg 108. As shown, the first leg 108 is configured to receive the SMC module 100 to provide SMC functionality to the base module 92. The second leg 112 is configured to include the PDU 102 having a plurality of outlets, each indicated at 118, which can include surge outlets and UPS outlets, which is illustrated in the embodiment of the modular power system 30 shown in FIG. 2. In another embodiment, for example, the modular power system shown in FIG. 3, the second leg 112 is configured to include the PDU 102 having a plurality of DC outlets. The base module 92 further includes a planar support 120 that is perpendicular to the first edge 110 of the first leg 108 and the second edge 114 and the third edge 116 of the second leg 112. The support 120 ensures that top surfaces of the UPS module 94 and the battery module 96, when installed on the base module 92, are parallel to a top surface of the base module 92 to create the look of a unitary, homogeneous appearing assembly.

The UPS module 94 includes a UPS module casing 122 configured to support the UPS, which is contained within the UPS module casing. As shown in FIG. 4A, the UPS module casing 122 has a reverse L-shaped feature (with respect to the L-shaped feature of the base module casing 98) that is designed to interact and fit within the L-shaped feature of the base module casing 98. The UPS module casing 122 includes a shorter leg or portion 124 having a first outer edge 126 and a second inner edge 128 that faces the third edge 116 of the second leg 112 of the base module casing 98. The UPS module casing 122 further includes a longer leg 130 having a third (long) edge 132 that faces the second edge 114 of the second leg 112 of the base module casing 98 and a fourth (short) edge 134 that faces the first edge 110 of the first leg 108 of the base module casing 98. When assembled, the respective edges of the UPS module 94 engage edges of the base module 92 to create the unitary, homogeneous appearance.

Referring to FIG. 4B, a portion of the base module 92 is shown, with the first edge 110 of the first leg 108 being enlarged for further discussion.

Figure 4C:
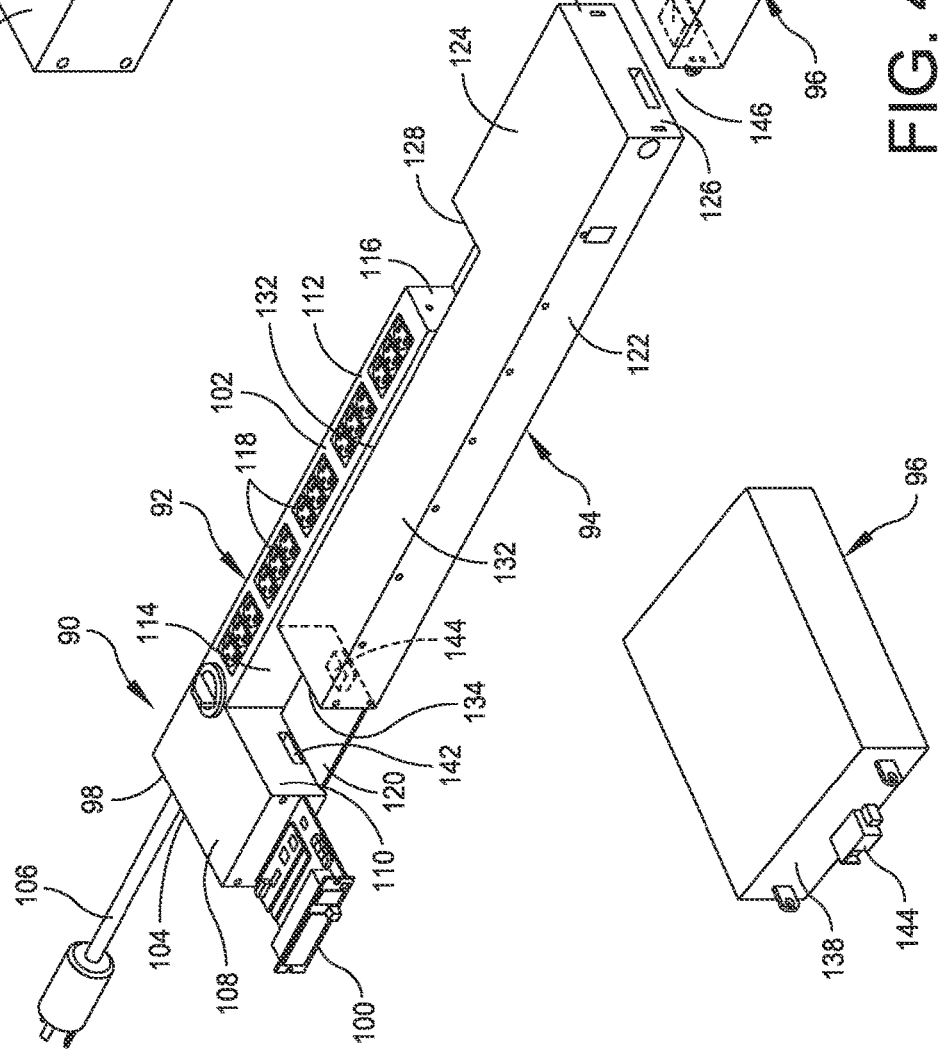
FIG. 4C is an enlarged perspective view of a battery module of the modular power system.

Referring to FIG. 4C, the battery module 96 is shown. The battery module 96 includes a battery module casing 136 that is generally rectangular in shape, having a thickness that is approximately the same thickness as the UPS module casing 122. The battery module casing 136 includes a first edge 138 having a surface that when assembled is configured to face the first outer edge 126 of the UPS module casing 122.

As shown in FIGS. 4A and 4B, the UPS module casing 122 includes a first interface 140 provided on a surface of the fourth edge 134 of the UPS module casing, which is configured to face the first surface of the first edge 110 of the base module casing 98 when installing the UPS module 94 on the base module 92. The base module casing 98 includes a first mating interface 142 provided on a surface of the first edge 110 of the base module casing, the first interface 140 being configured to connect to the first mating interface 142 to connect the UPS module 94 to the base module 92. In one embodiment, the first interface 140 is a male interconnect feature and the first mating interface 142 is a female interconnect feature. Any suitable hot-swappable interface connectors can be used to provide mechanical and electrical connection between the UPS module 94 and the base module 92. Further, the first interface 140 can be a female interconnect feature and the first mating interface 142 can be a male interconnect feature.

As shown in FIGS. 4A and 4C, the battery module casing 136 includes a second interface 144 provided on the surface of the first edge 138 of the battery module casing, which is configured to face a surface of the first outer edge 126 of the UPS module casing 122 when connecting the battery module 96 to the UPS module 94. The UPS module casing 122 includes a second mating interface 146 provided on the surface of the first outer edge 126 of the UPS module casing. The second interface 144 is configured to connect to the second mating interface 146 to connect the battery module 96 to the UPS module 94. In one embodiment, the second interface 144 is a male interconnect feature and the second mating interface 146 is a female interconnect feature. Any suitable hot-swappable interface connectors can be used to provide mechanical and electrical connection between the battery module 96 and the UPS module 94. Further, the second interface 144 can be a female interconnect feature and the second mating interface 146 can be a male interconnect feature. As shown, the surface of the first edge 138 of the battery module casing 136 is parallel to the surface of the first outer edge 126 of the UPS module casing 122.

When assembling the modular power system 90, the UPS module casing 94 is presented to the base module casing 92, with the third edge 132 and the fourth edge 134 of the UPS module casing 122 being positioned adjacent the second edge 114 and the first edge 110 of the base module casing 98, respectively. As shown in FIG. 4A, the L-shaped feature of the UPS module casing 122 is designed to fit within the L-shaped feature of the base module casing 98. By moving the UPS module 94 in a lengthwise direction toward the base module 92, with the third edge 132 of the UPS module casing 122 engaging the second edge 114 of the base module casing 98, the first interface 140 of the UPS module 94 is inserted into the first mating interface 142 of the base module 92. The UPS module 94 and the base module 92 can be provided with additional interconnects to assist in guiding and securing the UPS module into a connected position with the base module, and to provide additional functionality.

Further, after installing the UPS module 94, the battery module casing 136 of the battery module 96 is presented to the UPS module casing 122 of the UPS module with the first edge 138 of the battery module casing facing the first outer edge 126 of the UPS module casing. By moving the battery module 96 in a direction toward the UPS module 94, the second interface 144 of the battery module is inserted into the second mating interface 146 of the UPS module. The battery module 96 and the UPS module 94 can be provided with additional interconnects to assist in guiding and securing the battery module into a connected position with the UPS module, and to provide additional functionality.

Figure 5:
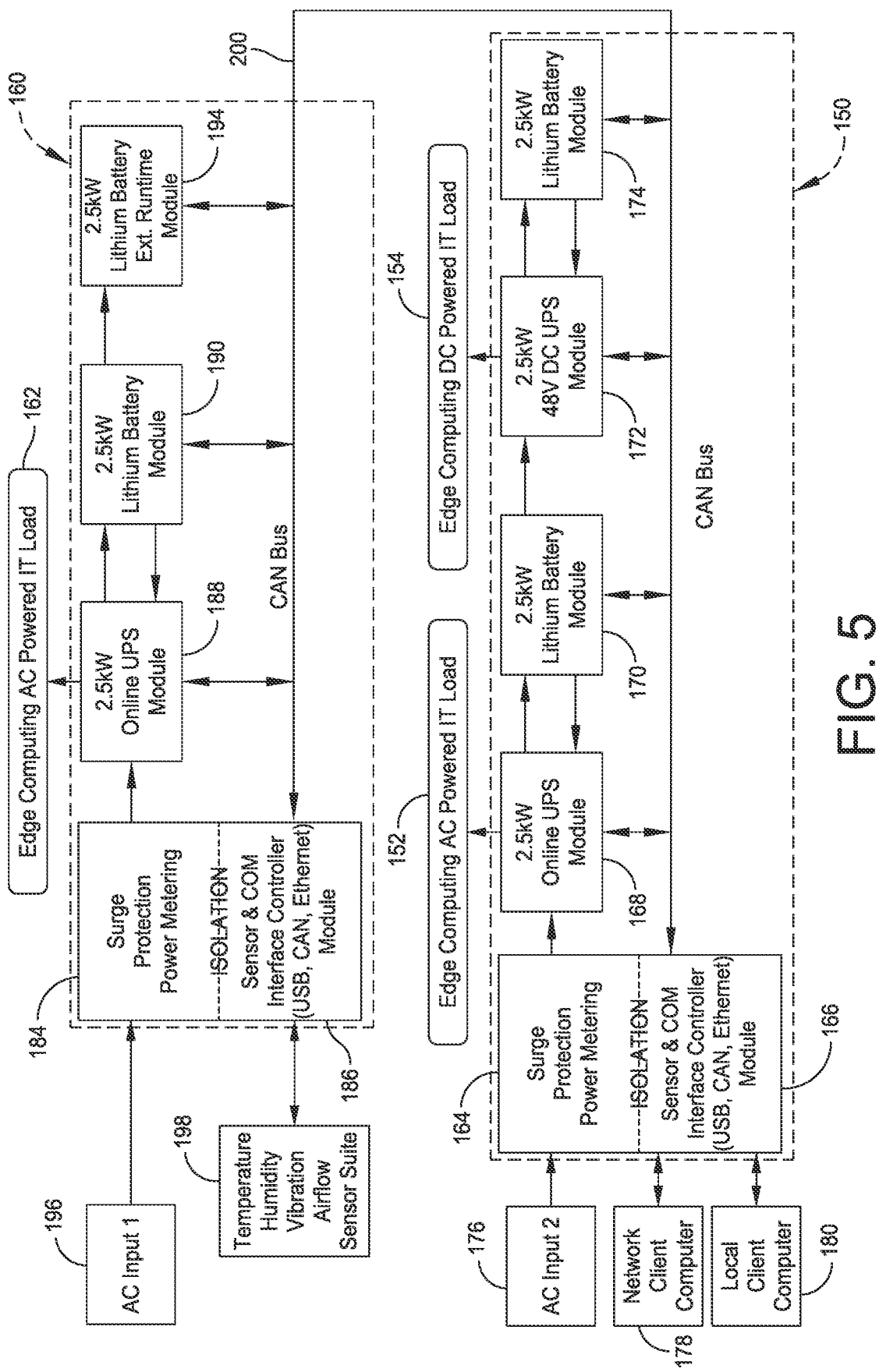
FIG. 5 is a schematic diagram of two modular power systems of embodiments of the present disclosure.

Referring to FIG. 5, the functionality of the modular power system configured to support AC and DC powered IT loads will be shown and described. As shown, a first modular power system, generally indicated at 150, is provided to support an AC powered IT load 152 and a DC powered IT load 154. A second modular power system, generally indicated at 160, is provided to support AC powered IT loads 162. The first modular power system 150 includes a surge protection power metering module 164 that is isolated from an SMC module 166. The first modular power system 150 further includes a 2.5 kW online UPS module 168, a first 2.5 kW battery module 170, a 2.5 kW 48 V DC UPS module 172, and a second 2.5 kW battery module 174. The surge protection power metering module 164 is configured to transfer AC power from an AC power input 176 to the online UPS module 168, the first battery module 170, the DC UPS module 172, and the second battery module 174. The online UPS module 168 provides power to the AC powered IT load 152 and the DC UPS module 172 provides power to a DC powered IT load 154.

In the event of a power failure, the first battery module 170 is configured to provide backup power to the online UPS module 168. Similarly, the second battery module 174 is configured to provide backup power to the DC UPS module 172. As shown, the SMC module 166 is configured to communicate with and receive information from each of the online UPS module 168, the first battery module 170, the DC UPS module 172, and the second battery module 174. The SMC module 166 takes this information and communicates with a network client computer 178 and/or a local client computer 180 to feed information to an equipment rack.

Still referring to FIG. 5, the second modular power module 160 includes a surge protection power metering module 184 that is isolated from an SMC module 186. The second modular power system 160 further includes a 2.5 kW online UPS module 188, a first 2.5 kW battery module 190, and a second 2.5 kW battery module 194, which can be referred to as an extended runtime battery module. The surge protection power metering module 184 is configured to transfer AC power from an AC power input 196 to the online UPS module 188, the first battery module 190, and the second battery module 194. The online UPS module 188 provides power to the AC powered IT load 162.

The first battery module 190 and the second battery module 194 are configured to provide backup power to the online UPS module 188. As shown, the SMC module 186 is configured to communicate with and receive information from each of the online UPS module 188, the first battery module 190, and the second battery module 194. The SMC module 186 takes this information and communicates with a temperature, humidity, vibration, airflow sensor suite 198.

In the shown embodiment, communication between the first modular power system 150 and the second modular power system 160 is provided by a controller area network (CAN) bus 200, which can be configured to communication information to an equipment rack or data center controllers.

Figure 6:
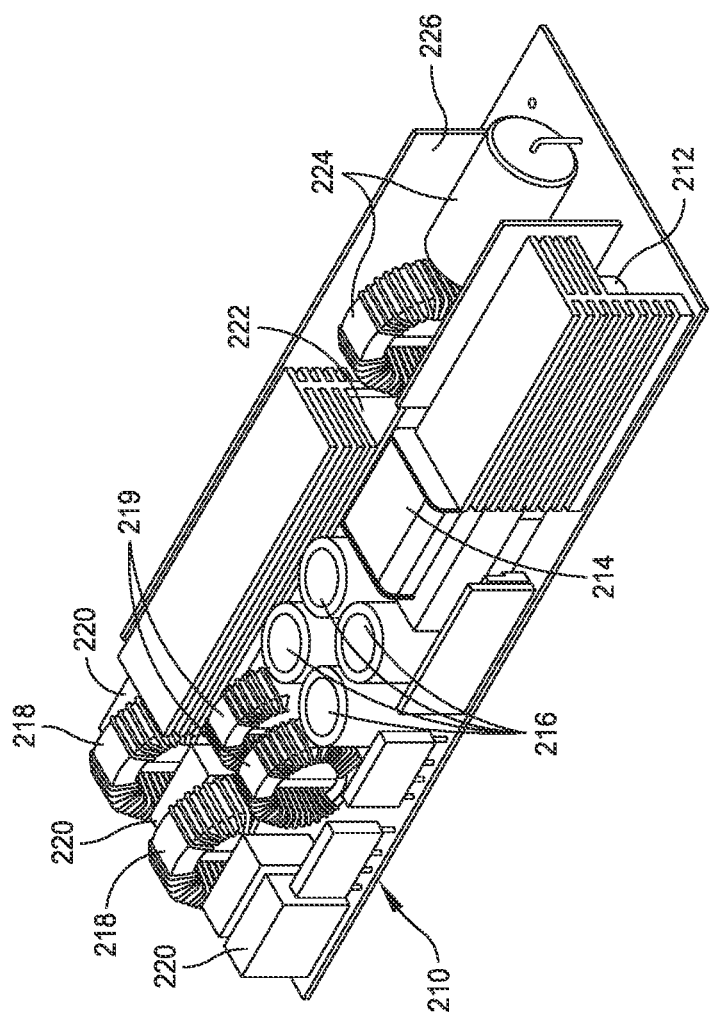
FIG. 6 is an enlarged perspective view of an uninterruptible power supply (UPS) module of the modular power system with packaging removed to reveal internal components of the UPS module.

Referring to FIG. 6, an exemplary UPS module is generally indicated at 210. The UPS module is shown with exterior packaging removed to reveal the constituent parts of the UPS module. As shown, the UPS module 210 includes an inverter 212, which is surrounded by a heat sink, a DC/DC transformer 214, four DC bus capacitors, each indicated at 216, two input EMI filter inductors, each indicated at 218, two power factor correction (PFC) inductors, each indicated at 219, three input electromagnetic interference (EMI) filter capacitors, each indicated at 220, a PFC and DC/DC converter 222, which is surrounded by a heat sink, and an output filter consisting of one output filter inductor and one capacitor, indicated at 224. A controller card 226 is provided to control the operation of the UPS module 210.

Figure 7:
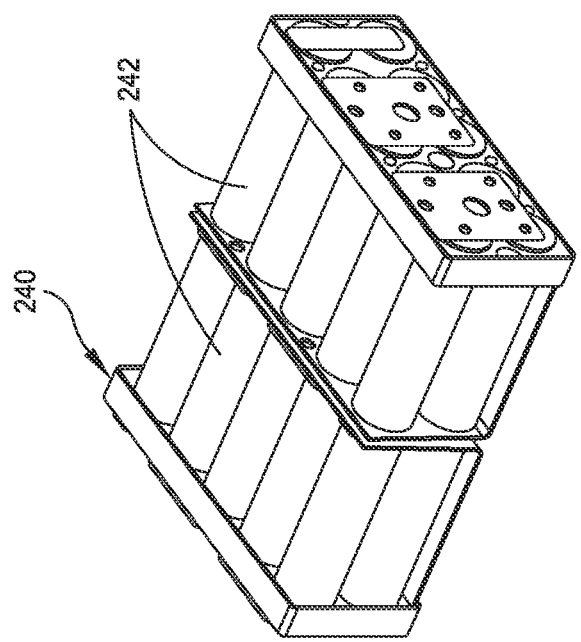
FIG. 7 is an enlarged perspective view of a battery module of the modular power system with packaging removed to reveal internal components of the battery module.

Referring to FIG. 7, an exemplary battery module is generally indicated at 240. The battery module 240 is shown with exterior packaging removed to review the constituent parts of the battery module. As shown, the battery module includes a plurality of lithium-ion battery cells, each indicated at 242. As mentioned, the battery module 240, depending on the load, can provide three to fifteen minutes of power to the modular power system.

Figure 8:
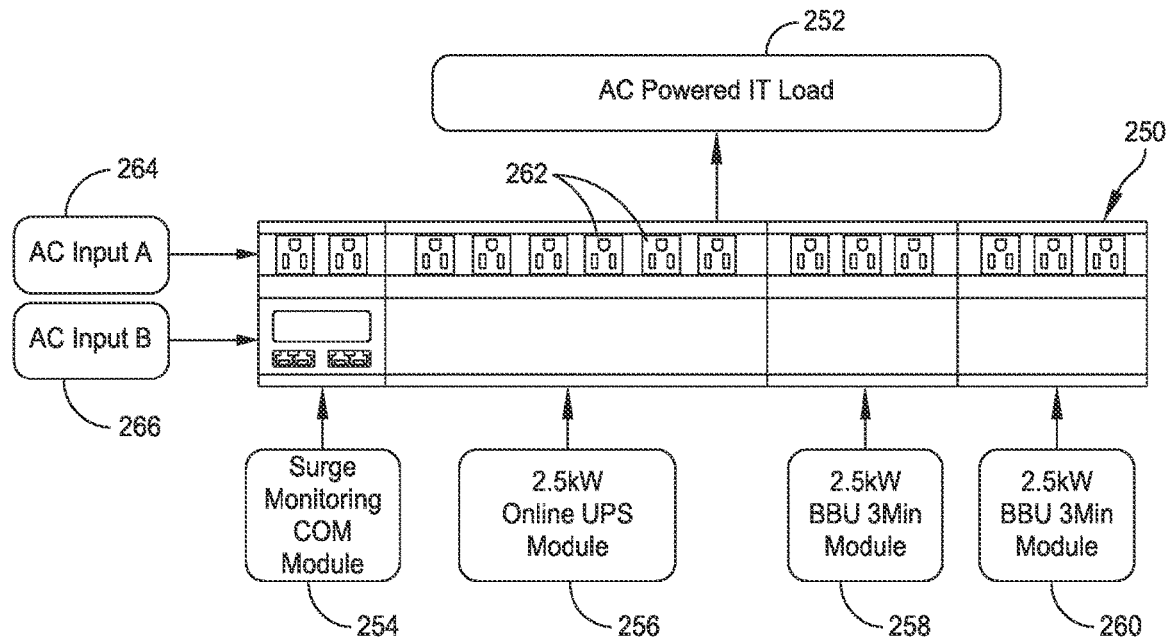
FIG. 8-14 are top plan views of modular power systems of embodiments of the present disclosure.

Referring to FIGS. 8 to 14, modular power systems having varying configurations are depicted and described below. FIG. 8 illustrates an embodiment of a modular power system, generally indicated at 250, which is configured to provide power to an AC powered IT load 252. As shown, the modular power system 250 includes a base module having an SMC module 254, a 2.5 kW online UPS module 256, a first 2.5 kW battery module 258, and a second 2.5 kW battery module 260. The base module further includes a PDU having a number of outlets, each indicated at 262, which are shown to be AC power outlets. The modular power system 250 is connected to a first AC power source by a first input 264 and to a second AC power source by a second input 266.

Figure 9:
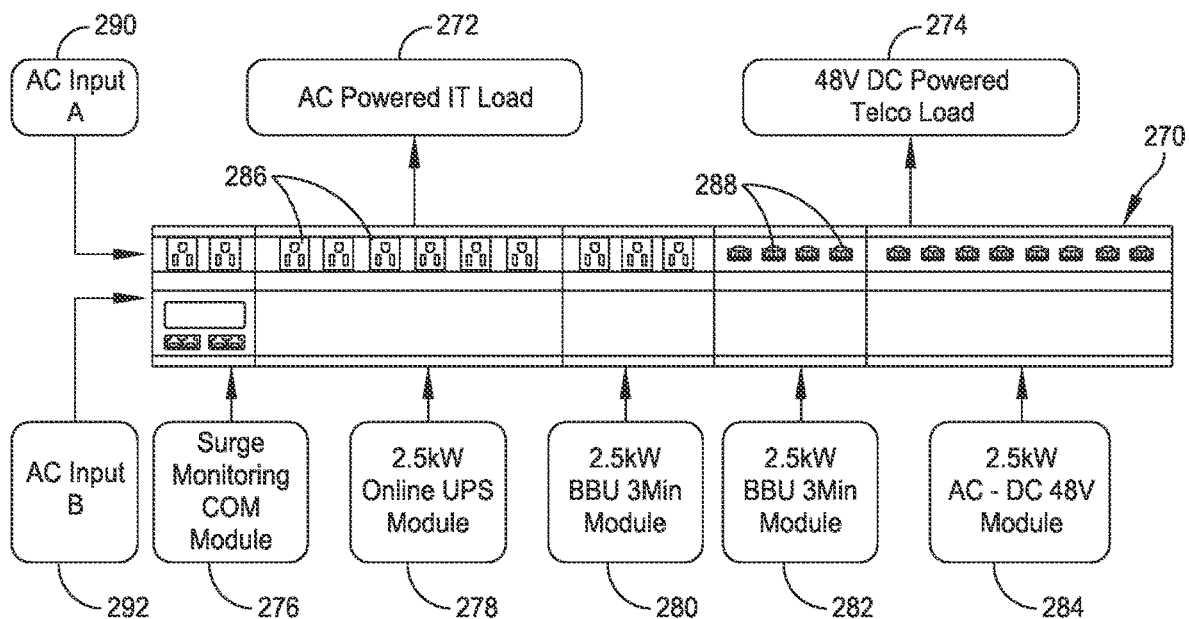

FIG. 9 illustrates an embodiment of a modular power system, generally indicated at 270, which is configured to provide power to an AC powered IT load 272 and a DC powered IT load 274. As shown, the modular power system 270 includes a base module having an SMC module 276, a 2.5 kW online UPS module 278, a first 2.5 kW battery module 280, a second 2.5 kW battery module 282, and a 2.5 kW AC DC 48 V module 284. The base module includes a PDU having a number of outlets, which are shown to be AC power outlets, each indicated at 286, and a number of ports, each indicated at 288. The modular power system 270 is connected to a first AC power source by a first input 290 and to a second AC power source by a second input 292.

Figure 10:
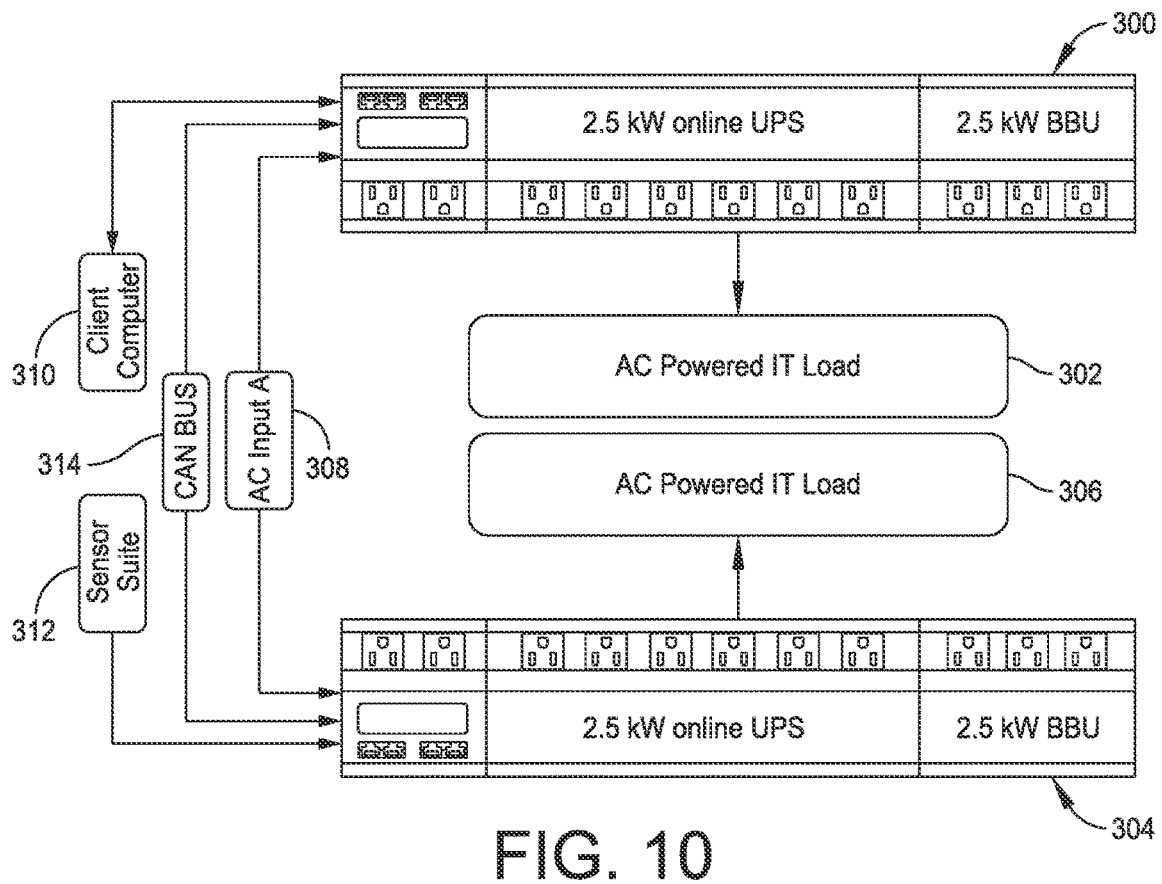

FIG. 10 illustrates an embodiment of a first modular power system, generally indicated at 300, which is configured to provide power to a first AC powered IT load 302, and a second modular power system, generally indicated at 304, which is configured to provide power to a second AC powered IT load 306. The first modular power system 300 includes a base module having an SMC module, a 2.5 kW online UPS module, and a 2.5 kW battery module. The base module includes PDU having a number of outlets, which are shown to be AC power outlets. The first modular power system is connected to an AC power source by an input 308. The first modular power system 300 further is connected to a client computer 310. The second modular power system 304 includes a base module having an SMC module, a 2.5 kW online UPS module, and a 2.5 kW battery module. The base module includes a PDU having a number of outlets, which are shown to be AC power outlets. As with the first modular power system 300, the second modular power system 304 is connected to the AC power source by the input 308. The second modular power system 304 further is connected to a sensor suite 312. The first modular power system 300 and the second modular power system 304 further are connected to a CAN bus 314 to facilitate communication between the two modular power systems and potentially a network controller associated with the equipment rack or the data center.

Figure 11:
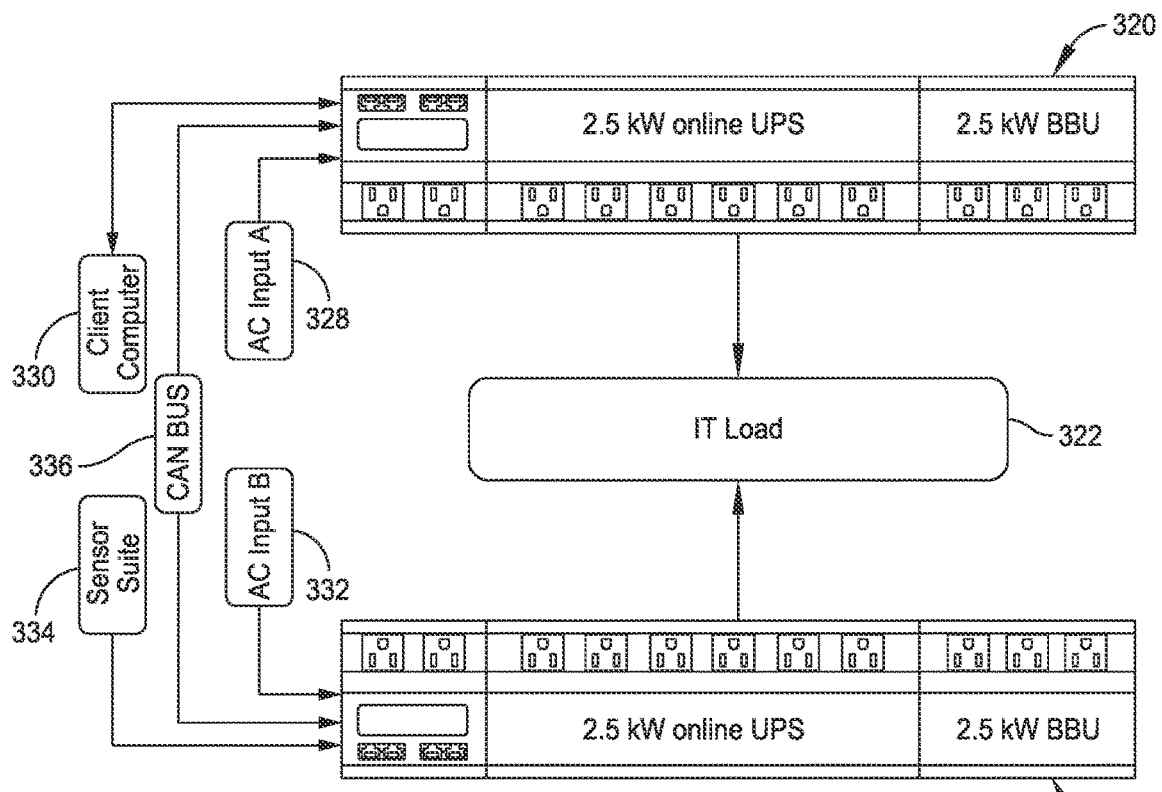

FIG. 11 illustrates an embodiment of N+1 redundant system configuration consisting of a first modular power system, generally indicated at 320, which is configured to provide power to an AC powered IT load 322 to the first input, and a second modular power system, generally indicated at 324, which is configured to provide power to the same AC powered IT load 322 to the second input. The first modular power system 320 includes a base module having an SMC module, a 2.5 kW online UPS module, and a 2.5 kW battery module. The base module includes a PDU having a number of outlets, which are shown to be AC power outlets. The first modular power system 320 is connected to an AC power source by an input 328. The first modular power system 320 further is connected to a client computer 330. The second modular power system 324 includes a base module having an SMC module, a 2.5 kW online UPS module, and a 2.5 kW battery module. The base module includes a PDU having a number of outlets, which are shown to be AC power outlets. The second modular power system 304 is connected to a separate AC power source by an input 332. The second modular power system 304 further is connected to a sensor suite 334. The first modular power system 320 and the second modular power system 324 further are connected to a CAN bus 336 to facilitate communication between the two modular power systems and potentially a network controller associated with the equipment rack or the data center.

Figure 12:
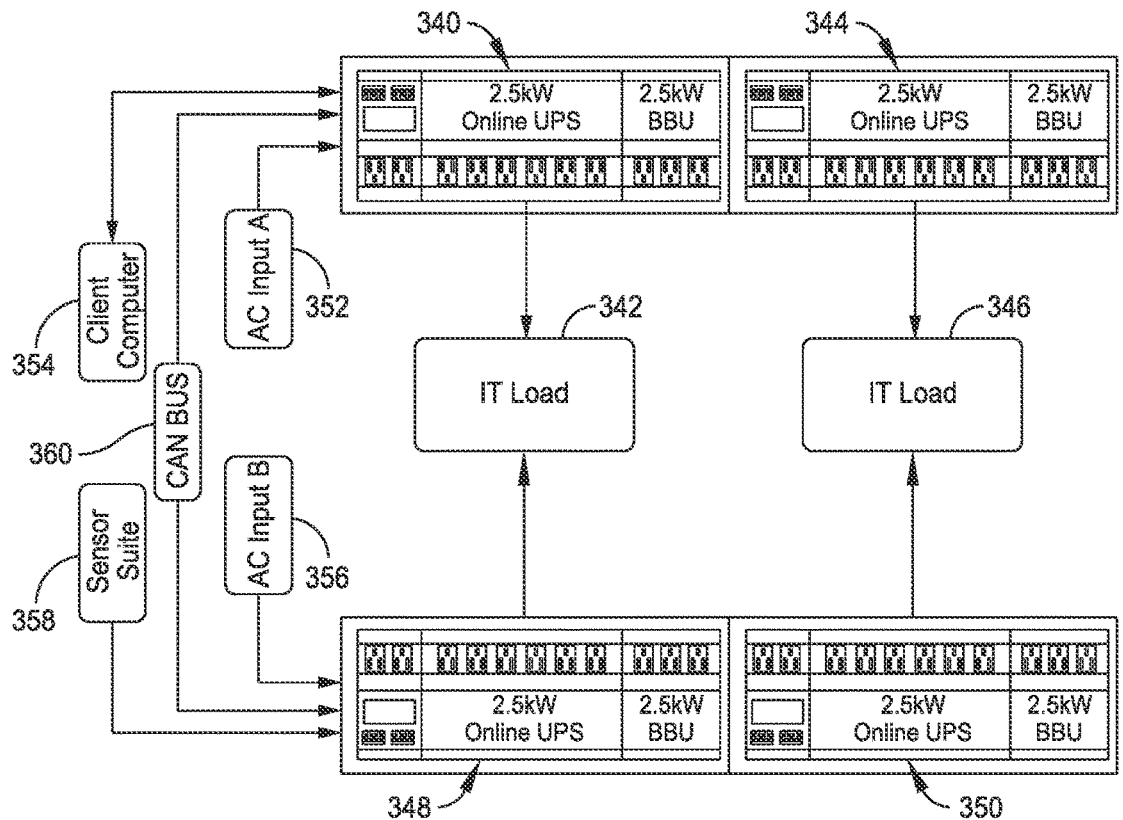

FIG. 12 illustrates an embodiment of a first modular power system, generally indicated at 340, which is configured to provide power to a first AC powered IT load 342, a second modular power system, generally indicated at 344, which is configured to provide power to a second AC powered IT load 346, a third modular power system, generally indicated at 348, which is configured to provide power to the first AC powered IT load 342, and a fourth modular power system, generally indicated at 350, which is configured to provide power to the second AC powered IT load 346. Each modular power system 340, 344, 348, 350 is similar in construction and includes a base module having an SMC module, a 2.5 kW online UPS module, and a 2.5 kW battery module. The base module includes a PDU having a number of outlets, which are shown to be AC power outlets. The first modular power system 340 and the second modular power system 344 are connected to an AC power source by an input 352 associated with the first modular power system. The first modular power system 340 and the second modular power system 344 further are connected to a client computer 354 by a port associated with the first modular power system. The third modular power system 348 and the fourth modular power system 350 are connected to a separate AC power source by an input 356 associated with the third modular power system. The third modular power system 348 and the fourth modular power system 350 further are connected to a sensor suite 358 by a port associated with the third modular power system. Communication between the first modular power system 340 and the second modular power system 344 and the third modular power system 348 and the fourth modular power system 350 is provided by a CAN bus 360, which is connected to the first modular power system 340 and the third modular power system 348 to facilitate communication between the two pairs of modular power systems.

Figure 13:
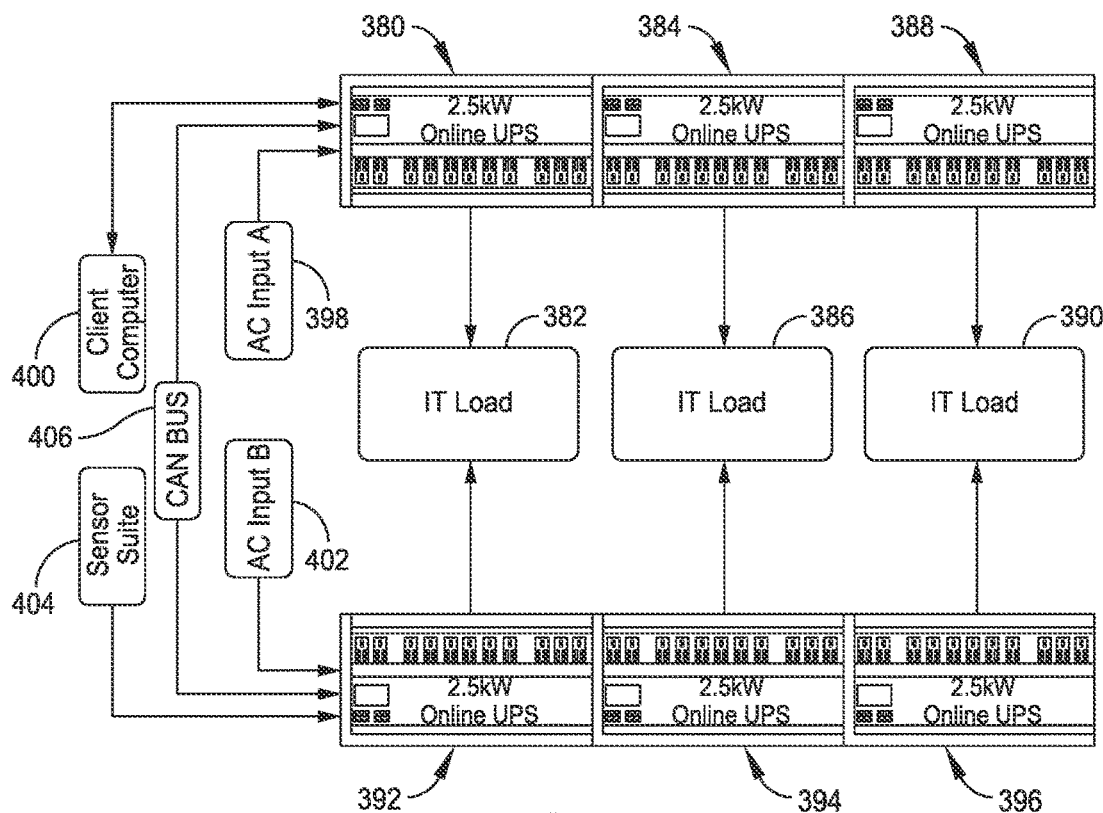

FIG. 13 illustrates an embodiment of a first modular power system, generally indicated at 380, which is configured to provide power to a first AC powered IT load 382, a second modular power system, generally indicated at 384, which is configured to provide power to a second AC powered IT load 386, a third modular power system, generally indicated at 388, which is configured to provide power to a third AC powered IT load 390, a fourth modular power system, generally indicated at 392, which is configured to provide power to the first AC powered IT load 382, a fifth modular power system, generally indicated at 394, which is configured to provide power to the second AC powered IT load 386, a sixth modular power system, generally indicated at 396, which is configured to provide power to the third AC powered IT load 390. Each modular power system 380, 384, 388, 392, 394, 396 is similar in construction and includes a base module having an SMC module, a 2.5 kW online UPS module, and a 2.5 kW battery module. The base module includes a PDU having a number of outlets, which are shown to be AC power outlets. The first modular power system 380, the second modular power system 384, and the third modular power system 388 are connected to an AC power source by an input 398 associated with the first modular power system 380. The first modular power system 380, the second modular power system 384, and the third modular power system 388 further are connected to a client computer 400 by a port associated with the first modular power system 380. The fourth modular power system 392, the fifth modular power system 394, and the sixth modular power system 396 are connected to a separate AC power source by an input 402 associated with the fourth modular power system 392. The fourth modular power system 392, the fifth modular power system 394, and the sixth modular power system 396 further are connected to a sensor suite 404 by a port associated with the fourth modular power system 392. Communication between the first modular power system 380, the second modular power system 384, and the third modular power system 388 and the fourth modular power system 392, the fifth modular power system 394, and the sixth modular power system 396 is provided by a CAN bus 406, which is connected to the first modular power system 380 and the fourth modular power system 392 to facilitate communication between the two pairs of modular power systems.

Figure 14:
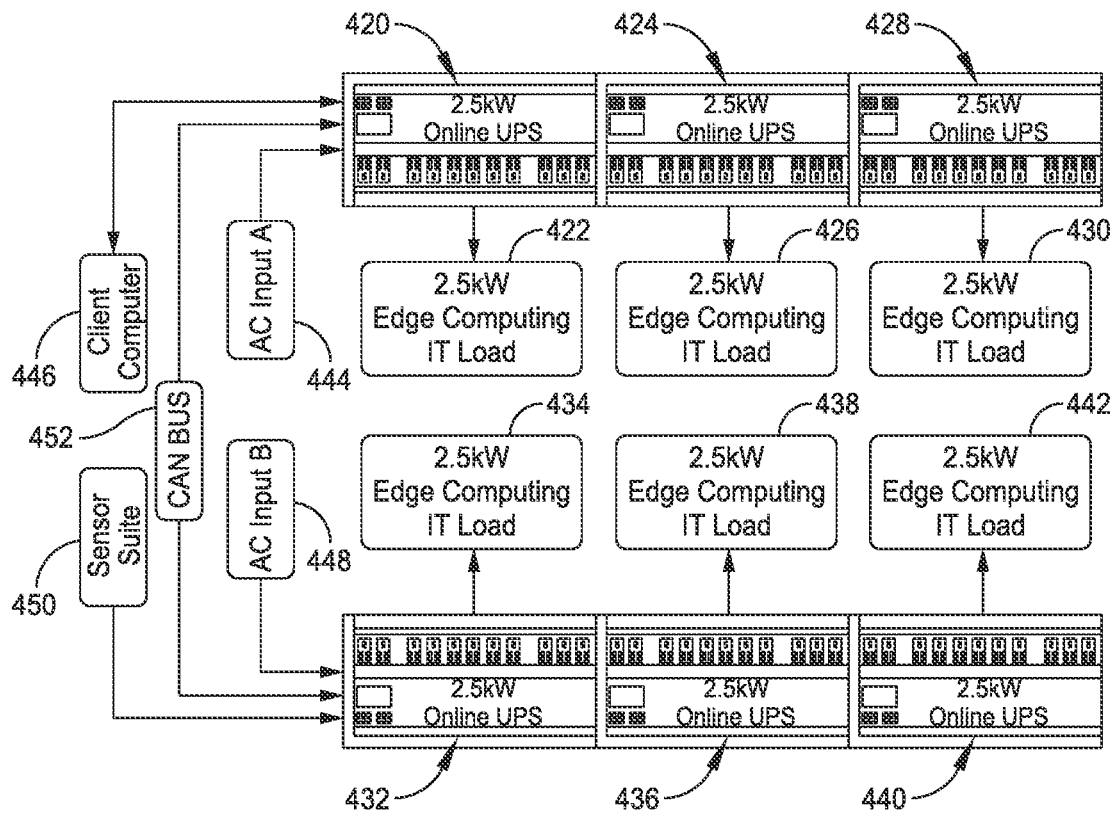

FIG. 14 illustrates an embodiment of a first modular power system, generally indicated at 420, which is configured to provide power to a first AC powered IT load 422, a second modular power system, generally indicated at 424, which is configured to provide power to a second AC powered IT load 426, a third modular power system, generally indicated at 428, which is configured to provide power to a third AC powered IT load 430, a fourth modular power system, generally indicated at 432, which is configured to provide power to a fourth AC powered IT load 434, a fifth modular power system, generally indicated at 436, which is configured to provide power to a fifth AC powered IT load 438, a sixth modular power system, generally indicated at 440, which is configured to provide power to a sixth AC powered IT load 442. Each modular power system 420, 424, 428, 432, 436, 438 is similar in construction and includes a base module having an SMC module, a 2.5 kW online UPS module, and a 2.5 kW battery module. The base module includes a PDU having a number of outlets, which are shown to be AC power outlets. The first modular power system 420, the second modular power system 424, and the third modular power system 428 are connected to an AC power source by an input 444 associated with the first modular power system 420. The first modular power system 420, the second modular power system 424, and the third modular power system 428 further are connected to a client computer 446 by a port associated with the first modular power system 420. The fourth modular power system 432, the fifth modular power system 436, and the sixth modular power system 440 are connected to a separate AC power source by an input 448 associated with the fourth modular power system 432. The fourth modular power system 432, the fifth modular power system 436, and the sixth modular power system 440 further are connected to a sensor suite 450 by a port associated with the fourth modular power system 432. Communication between the first modular power system 420, the second modular power system 424, and the third modular power system 428 and the fourth modular power system 432, the fifth modular power system 436, and the sixth modular power system 440 is provided by a CAN bus 452, which is connected to the first modular power system 420 and the fourth modular power system 432 to facilitate communication between the two pairs of modular power systems.

Figure 15:
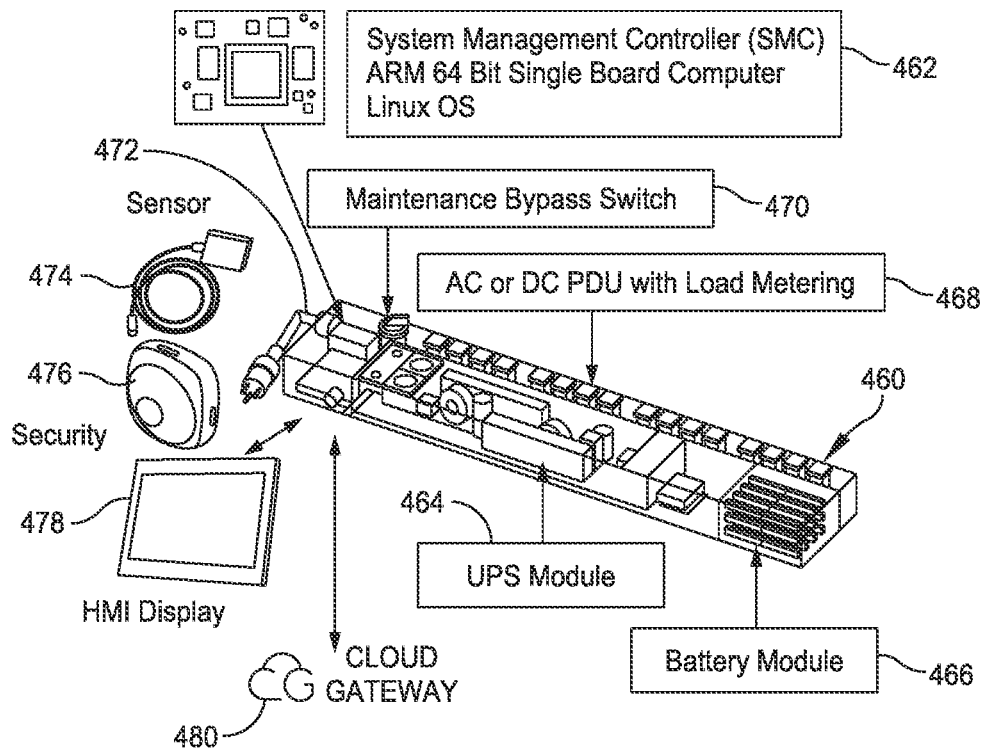
FIG. 15 is a perspective view of a modular power system of an embodiment of the present disclosure with packaging removed to reveal internal components of the modular power system.

Referring to FIG. 15, an exemplary modular power system is generally indicated at 460. As shown, the modular power system includes a SMC module 462, a UPS module 464, and a battery module 468. In one embodiment, the SMC module 462 includes an ARM 64-bit single board computer with a Linux operating system. Further, the modular power system 460 includes an AC or DC PDU 468 with load metering capability and a maintenance bypass switch 470, which is configured to bypass the UPS of the UPS module 464 while maintaining power to the PDU 468 during UPS service or UPS module replacement. As shown, the maintenance bypass switch 470 embodies a turn knob that provides an operator to switch the modular power system 460 from an operating mode to a bypass mode. The PDU 468 of the modular power system 460 includes several outlets, e.g., AC outlets, with the load metering capability. The modular power system 460 further includes several ports to receive, among other things, AC power input 472, a sensor connector 474, a security connector 476, an HMI display 478, and internet connector, e.g., cloud gateway 480.

Figure 16:
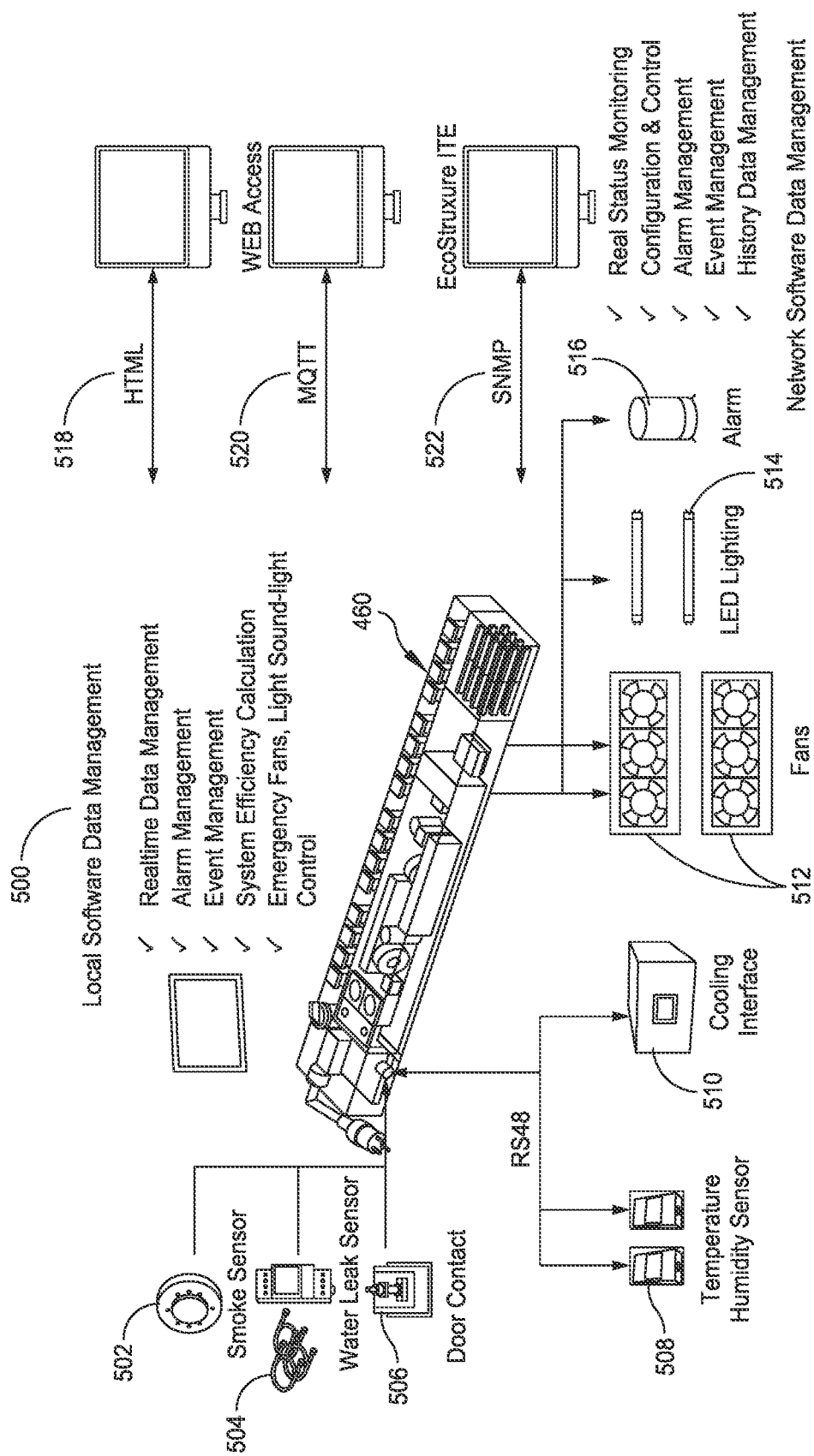
FIG. 16 is a perspective view of the modular power system shown in FIG. 15 illustrating further functionality.

Referring additionally to FIG. 16, further functionality of the modular power system 460 may include local software data management 500 associated with the SMC module 462. Such software may include real-time data management, alarm management, event management, system efficiency calculation, and emergency fans, light and sound-light control. The sensors may include, for example, a smoke sensor 502, a water leak sensor 504, and a door contact sensor 506. A separate temperature and humidity sensor 508 may be provided, with the sensor being coupled to a cooling interface 510 and fans, each indicated at 512, to provide cooling to the modular power system 460. As mentioned above, the modular power system 460 may be coupled to LED lighting 514 and an alarm 516 to provide visual and audible notifications to an operator. The modular power system 460 may communicate via the cloud gateway 480 with a controller associated with the equipment rack or the data center by a number of protocols, including, but not limited to HTML, MQTT and SNMP protocols 518, 520, 522, respectively. The modular power system 460 can be configured to provide real-time status monitoring, immediate configuration and control, alarm management, event management, and history data management.

In some embodiments, the modular power system 460 can be daisy-chained with another modular power system to provide a fully integrated micro-data center solution.

Various aspects and functions in accordance with the present embodiments may be implemented as specialized hardware or software executing in one or more computer systems, which may include a computer system that includes processor, memory, bus, interface, and storage. The processor may perform a series of instructions that result in manipulated data. The processor may be a commercially available processor, multi-processor, microprocessor, or controller as many other processors and controllers are available. The processor may be connected to other system elements, including one or more memory devices, by bus.

Memory may be used for storing programs and data during operation of computer system. Thus, memory may be a relatively high performance, volatile, random access memory such as a dynamic random access memory (DRAM) or static memory (SRAM). However, memory may include any device for storing data, such as a disk drive or other non-volatile, non-transitory, storage device. Various embodiments in accordance with the present disclosure may organize memory into particularized and, in some cases, unique structures to perform the aspects and functions disclosed herein.

Components of the computer system may be coupled by an interconnection element, such as a bus, which may include one or more physical busses, for example, busses between components that are integrated within a same machine, but may include any communication coupling between system elements including specialized or standard computing bus technologies such as IDE, SCSI, PCI, and InfiniBand. Thus, the bus enables communications, for example, data and instructions, to be exchanged between system components of computer system.

The computer system also may include one or more interface devices, such as input devices, output devices, and combination input/output devices. Interface devices may receive input or provide output. More particularly, output devices may render information for external presentation. The interface devices may include, for example, one or more graphical user interfaces that may be disposed proximate to or separate from other components of the computer system. A graphical user interface of the computer system may, for example, be displayed through a web browser that accesses information from the memory. Input devices may accept information from external sources. Examples of interface devices include keyboards, mouse devices, trackballs, microphones, touch screens, printing devices, display screens, speakers, network interface cards, etc. The interface devices allow computer system to exchange information and communicate with external entities, such as users and other systems.

The storage system may include a computer readable and writeable, nonvolatile, non-transitory, storage medium in which instructions are stored that define a program to be executed by the processor. The program to be executed by the processor may cause the processor or computer system to perform any one or more embodiments of the methods disclosed herein. The storage system also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk, or flash memory, among others. In operation, the processor or some other controller may cause data to be read from the nonvolatile recording medium into another memory, such as memory, that allows for faster access to the information by the processor than does the storage medium included in storage system. The memory may be located in storage system or in memory, however, processor may manipulate the data within the memory, and then may copy the data to the medium associated with storage system after processing is completed. A variety of components may manage data movement between the medium and integrated circuit memory element and the presently described embodiments are not limited thereto. Further, the embodiments are not limited to a particular memory system or data storage system. Portions of the memory or storage system may be included in the same computer system as other components of the computer system or may be resident in a cloud-based system that is accessible via the internet or other communications system or protocol.

Although the computer system is shown by way of example as one type of computer system upon which various aspects and functions in accordance with the present embodiments may be practiced, any aspects of the presently disclosed embodiments are not limited to being implemented on the computer system. Various aspects and functions in accord with the presently disclosed embodiments may be practiced on one or more computers having a different architectures or components. For instance, computer system may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

The computer system may be a computer system including an operating system that manages at least a portion of the hardware elements included in computer system. Usually, a processor or controller, such as processor, executes a commercially available operating system. Many types of operating systems may be used, and embodiments are not limited to any particular implementation.

The processor and operating system together define a computer platform for which application programs in high-level programming languages may be written. These component applications may be executable, intermediate, for example, C−, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, Small-Talk, Java, C++, Ada, or C # (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML, or other format that, when viewed in a window of a browser program, render aspects of a graphical-user interface or perform other functions. Further, various embodiments in accord with the present disclosure may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle WA., Oracle Database from Oracle of Redwood Shores, CA, and MySQL from MySQL AB, a subsidiary of Oracle or integration software such as Web Sphere middleware from IBM of Armonk, NY. However, a computer system running, for example, SQL Server may be able to support both aspects in accord with the presently disclosed embodiments and databases for sundry applications.

It is to be appreciated that examples of the methods, systems, and apparatuses discussed herein are not limited in application to the details of construction and the arrangement of components set forth in the following description or illustrated in the accompanying drawings. The methods, systems, and apparatuses are capable of implementation in other examples and of being practiced or of being carried out in various ways. Examples of specific implementations are provided herein for illustrative purposes only and are not intended to be limiting. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A power system comprising:
a base module including a system management controller (SMC) and a power distribution unit (PDU), the base module further including a base module casing having an L-shaped feature having a first leg with a first edge and a second leg with a second edge, the second edge being perpendicular to the first edge, the second leg further includes a third edge, which is parallel to the first edge of the first leg;
an uninterruptible power supply (UPS) module including a UPS, the UPS module further including a UPS module casing having a reverse L-shaped feature configured to interact and fit within the L-shaped feature of the base module casing, the UPS module casing including a shorter leg having a first outer edge and a second inner edge that faces the third edge of the second leg of the base module casing and a longer leg having a third edge that faces the second edge of the second leg of the base module casing and a fourth edge that faces the first edge of the first leg of the base module casing; and
a battery module including a battery, the battery module further including a battery module casing including an outer edge configured to face the first outer edge of the shorter leg of the UPS module casing.

2. The power system of claim 1, wherein the base module casing of the base module is configured to support the SMC and the PDU.

3. The power system of claim 2, wherein the first edge of the base module casing is shorter than the second edge of the base module casing.

4. The power system of claim 3, wherein the second leg of the base module casing includes a plurality of outlets.

5. The power system of claim 4, wherein the plurality of outlets includes at least one of a surge outlet and a UPS outlet.

6. The power system of claim 3, wherein the second leg of the base module casing includes a plurality of ports.

7. The power system of claim 6, wherein the plurality of ports includes at least one of a sensor port, a USB port and an ethernet port.

8. The power system of claim 1, wherein the fourth edge of the longer leg of the UPS module casing includes a first interface, and wherein the first edge of the first leg of the base module casing includes a first mating interface, the first interface being configured to connect to the first mating interface to connect the UPS module to the base module.

9. The power system of claim 8, wherein the first interface is a male hot-swappable interconnect feature and the first mating interface is a female hot-swappable interconnect feature.

10. The power system of claim 8, wherein the battery module includes a second interface provided on the outer edge of the battery module casing, and wherein the UPS module includes a second mating interface provided on the first outer edge of the UPS module, the second interface being configured to connect to the second mating interface to connect the battery module to the UPS module.

11. The power system of claim 10, wherein the second interface is a male hot-swappable interconnect feature and the second mating interface is a female hot-swappable interconnect feature.

12. The power system of claim 10, wherein the first outer edge and the fourth edge of the UPS module casing are parallel with one another.

13. The power system of claim 1, wherein the UPS of the UPS module includes an AC-DC converter.

14. The power system of claim 1, wherein the battery module includes an LED to illustrate a state of the battery.

15. The power system of claim 1, further comprising an extended runtime battery module.

16. The power system of claim 1, further comprising a maintenance bypass switch configured to bypass the UPS of the UPS module while maintaining power to equipment coupled to the PDU during UPS service or UPS module replacement.

17. The power system of claim 1, wherein the base module includes a user interface.

18. The power system of claim 1, wherein the UPS module is detachable from the base module in a direction perpendicular to the first edge of the first leg of the base module casing.

19. A method of assembling a power system, the method comprising:
providing an integrated system management controller (SMC) and power distribution unit (PDU) base module including a SMC and a PDU, the base module including a base module casing having an L-shaped feature having a first leg with a first edge and a second leg with a second edge, the second edge being perpendicular to the first edge, the second leg further including a third edge, which is parallel to the first edge of the first leg;
installing an uninterruptible power supply (UPS) module on the base module, the UPS module including a UPS, the UPS module further including a UPS module casing having a reverse L-shaped feature configured to interact and fit within the L-shaped feature of the base module casing, the UPS module casing including a shorter leg having a first outer edge and a second inner edge that faces the third edge of the second leg of the base module casing and a longer leg having a third edge that faces the second edge of the second leg of the base module casing and a fourth edge that faces the first edge of the first leg of the base module casing; and
connecting a battery module to the UPS module in a direction perpendicular to the first edge of the first leg of the base module casing, the battery module including a battery, the battery module further including a battery module casing including an outer edge configured to face the first outer edge of the shorter leg of the UPS module casing.

20. The method of claim 19, wherein the UPS module is installed in a direction perpendicular to the first edge of the first leg of the base module casing.

21. The method of claim 20, further comprising removing the UPS module from the base module in a direction perpendicular to the first edge of the first leg of the base module casing.

22. The method of claim 19, further comprising removing the battery module from the UPS module in a direction perpendicular to the first edge of the first leg of the base module casing.

23. The method of claim 19, wherein the base module casing of the base module is configured to support the SMC and the PDU, the first edge of the base module casing is shorter than the second edge of the base module casing.

24. The method of claim 19, wherein the fourth edge of the longer leg of the UPS module casing includes a first interface, and wherein the first edge of the first leg of the base module casing includes a first mating interface, and wherein installing the UPS module on the base module includes connecting the first interface to the first mating interface.

25. The method of claim 24, wherein the first interface is a male hot-swappable interconnect feature and the first mating interface is a female hot-swappable interconnect feature.

26. The method of claim 24, wherein the battery module includes a second interface provided on the outer edge of the battery module casing, and wherein the UPS module includes a second mating interface provided on the first outer edge of the UPS module, and wherein connecting the battery module to the UPS module includes connecting the second interface to the second mating interface.

27. The method of claim 26, wherein the second interface is a male hot-swappable interconnect feature and the second mating interface is a female hot-swappable interconnect feature.

28. The method of claim 19, further comprising connecting an extended runtime battery module to one of the UPS module and the battery module.

29. The method of claim 19, further comprising bypassing the UPS of the UPS module while maintaining power to equipment coupled to the PDU during UPS service or UPS module replacement.

30. A method of providing uninterruptible power in an equipment rack having a plurality of electronic equipment, the method comprising:
   securing a modular power system within an interior of the equipment rack, the modular power system including a base module having a system management controller (SMC) and a power distribution unit (PDU), an uninterruptible power supply (UPS) module including a UPS, and a battery module including a battery, wherein the base module includes a base module casing having an L-shaped feature having a first leg with a first edge and a second leg with a second edge, the second edge being perpendicular to the first edge, the second leg further including a third edge, which is parallel to the first edge of the first leg, the UPS module further including a UPS module casing having a reverse L-shaped feature configured to interact and fit within the L-shaped feature of the base module casing, the UPS module casing including a shorter leg having a first outer edge and a second inner edge that faces the third edge of the second leg of the base module casing and a longer leg having a third edge that faces the second edge of the second leg of the base module casing and a fourth edge that faces the first edge of the first leg of the base module casing, the battery module further including a battery module casing including an outer edge configured to face the first outer edge of the shorter leg of the UPS module casing, and wherein the battery module is detachable from UPS module in a direction perpendicular to the first edge;
   coupling the modular power system to a power input; and
   coupling each of the plurality of electronic equipment provided in the equipment rack to the modular power system to provide power to each of the plurality of electronic equipment, the modular power system being configured to provide uninterruptible power to each of the plurality of electronic equipment in the event of failure of the power input.

31. The power system of claim 1, wherein the battery module is detachable from UPS module in a direction perpendicular to the first outer edge of the UPS module casing.

* * * * *